(12) United States Patent
Cociglio

(10) Patent No.: US 11,996,997 B2
(45) Date of Patent: *May 28, 2024

(54) ROUND-TRIP PACKET LOSS MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/779,690

(22) PCT Filed: Nov. 27, 2020

(86) PCT No.: PCT/EP2020/083625
§ 371 (c)(1),
(2) Date: May 25, 2022

(87) PCT Pub. No.: WO2021/105355
PCT Pub. Date: Jun. 3, 2021

(65) Prior Publication Data
US 2023/0009799 A1  Jan. 12, 2023

(30) Foreign Application Priority Data
Nov. 29, 2019 (IT) .................. 102019000022458

(51) Int. Cl.
*H04L 43/0829* (2022.01)
*H04L 43/02* (2022.01)
(Continued)

(52) U.S. Cl.
CPC .......... *H04L 43/0829* (2013.01); *H04L 43/02* (2013.01); *H04L 43/062* (2013.01); *H04L 43/0852* (2013.01)

(58) Field of Classification Search
CPC ... H04L 43/0829; H04L 43/02; H04L 43/062; H04L 43/0852; H04L 43/0841; H04L 1/203
See application file for complete search history.

(56) References Cited

U.S. PATENT DOCUMENTS

2010/0008250 A1* 1/2010 Nomura ............... H04L 43/0852
370/252
2014/0146686 A1  5/2014 Sakurai et al.
(Continued)

FOREIGN PATENT DOCUMENTS

EP       2 731 301 A1    5/2014
WO    WO 2010/072251 A1  7/2010

OTHER PUBLICATIONS

International Search Report dated Feb. 10, 2021 in PCT/EP2020/083625 Nov. 27, 2020, 3 pages.
(Continued)

*Primary Examiner* — Philip J Chea
*Assistant Examiner* — James Ross Hollister
(74) *Attorney, Agent, or Firm* — Oblon, McClelland, Maier & Neustadt, L.L.P.

(57) ABSTRACT

In a method for exchanging packets between first and second nodes of a packet-switched network, each packet comprises two fields settable to an idle value or measurement value. The first node transmits to the second node first packets having a filed set to measurement value. Upon reception of each first packet, the second node transmits back to the first node a second packet having a field set to measurement value. Upon reception of each second packet, the first node transmits to the second node a third packet having another field set to measurement value. A packet loss measurement is calculated as a difference between the number of first packets and the number of third packets.

17 Claims, 4 Drawing Sheets

(51) Int. Cl.
*H04L 43/062* (2022.01)
*H04L 43/0852* (2022.01)

(56) References Cited

U.S. PATENT DOCUMENTS

2017/0244623 A1* 8/2017 Cociglio ............. H04L 43/0852
2020/0403890 A1* 12/2020 McCulley ........... H04L 43/0864

OTHER PUBLICATIONS

Trammell et al.: Internet draft "The Addition of a Spin Bit to the QUIC Transport Protocol draft-trammell-quic-spin-01", Dec. 13, 2017, 22 pages.

* cited by examiner

ROUND-TRIP PACKET LOSS MEASUREMENT IN A PACKET-SWITCHED COMMUNICATION NETWORK

TECHNICAL FIELD

The present invention relates to the field of communication networks. In particular, the present invention relates to a method for exchanging packets in a packet-switched communication network, a method for performing round-trip packet loss measurements and to a packet-switched network configured to implement such methods.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss of packet flows in a communication network is of particular interest for network operators.

WO 2010/072251, in the name of the same Applicant, discloses a method for measuring packet loss on a packet flow which uses an alternate marking technique, whereby the packet flow to be measured is divided into blocks of packets comprising a first marking value (e.g. a dedicated marking bit in their header set to "1") and blocks of packets comprising a second marking value (e.g. e.g. a dedicated marking bit in their header set to "0"). The marking value is periodically switched, so that the blocks of packets with the first marking value are interleaved with the blocks of packets with the second marking value. Two measurement points are provided on the path of the marked packets. Each measurement point implements a couple of counters counting the number of packets with the first and second marking values, respectively. The packet loss between the two measurement points is calculated using the counter values.

As known, QUIC (Quick UDP Internet Connections) is a transport layer (layer 4) network protocol designed to support multiplexed connections between two endpoints over User Datagram Protocol (UDP). In order to manage reception sequence errors, the QUIC header comprises a packet number field, wherein a packet number is written in each packet upon its transmission.

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT (round-trip time) measurements on two counter-propagating packet flows exchanged between two nodes. According to the Internet draft, both the nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has perceived the need to provide methods for exchanging packets and performing a packet loss measurement in a packet-switched communication network which—while the spin bit technique described above allows to measure a rough RTT—allows any intermediate measurement point placed between two nodes (e.g. client and server, according to the QUIC terminology) to measure a rough "round-trip packet loss" between the two nodes, where the expression "round-trip packet loss" indicates a measurement of the number of packets lost in two counter-propagating flows exchanged between the two nodes.

The Applicant has noticed that such round-trip packet loss can not be measured as a sum of the one-way packet losses affecting the two counter-propagating flows and measured for example according to the above mentioned WO 2010/072251.

First of all, indeed, the measurement of each one-way packet loss would require two measurement points.

Moreover, the Applicant has noticed that a mere sum of the one-way packet losses would not take into account the fact that, typically, the two counter-propagating directions of a link (e.g. upstream and downstream) may exhibit very different packet rates, e.g. 1:10. Hence, during a marking period, the one-way packet loss may be measured on different numbers of packets in the two directions and, therefore, a same number of lost packets may have very different weights in the two directions.

For example, if 1 packet of 100 transmitted packets is lost in one direction (e.g. downstream) during a certain marking period and 1 packet of 10 transmitted packets is lost in the other direction (e.g. upstream) during the same marking period, a mere sum of the one-way packet losses would be 2 which, averaged on the overall number of transmitted packets 100+10, would provide a round-trip packet loss rate of 2/110.

As another example, if 2 packets are lost of 100 transmitted packets in the downstream direction and no packet is lost of 10 transmitted packets in the upstream direction, the mere sum of the one-way packet losses would be again 2. The round-trip packet loss rate would then be again 2/110, irrespective of the fact that—differently from the previous case—the lost packets are now all concentrated in the downstream direction having the higher packet rate, and then the loss weight is reduced.

In view of the above, the Applicant has tackled the problem of providing methods for exchanging packets and performing a packet loss measurement in a packet-switched communication network, which allow any intermediate measurement point placed between two nodes to measure a round-trip packet loss taking into account the fact that the packet rates in the two directions may be different.

The Applicant has realized that, in order to provide an accurate measurement of the round-trip packet loss which takes in due account the different packet rates in the two counter-propagating directions, the measurement shall be performed on the same number of packets in both directions.

For example, if 1 packet of 100 transmitted packets is lost in one direction (e.g. downstream) during a certain marking period and 1 packet of 10 transmitted packets is lost in the other direction (e.g. upstream) during the same marking period, the measurement in the downstream direction will be performed on 10 packets only amongst the 100 transmitted ones. If the considered packets include the lost one (less probable case) the downstream packet loss is again 1, which provides a round-trip packet loss rate of 2/20. Otherwise (more probable case) the downstream packet loss is 0, which provides a round-trip packet loss rate of 1/20. By repeating such downstream measurement several times, an average downstream packet loss of 0.1 would be found, which would provide an average round-trip packet loss rate of 1.1/20.

If instead 2 packets are lost of 100 transmitted packets in the downstream direction and no packet is lost of 10 transmitted packets in the upstream direction, performing the measurement in the downstream direction on 10 packets only amongst the 100 transmitted ones provides, in case the considered packets include the lost ones (less probable case) the downstream packet loss is again 2, a round-trip packet loss rate of 2/20. Otherwise (more probable case) the downstream packet loss is 0, which provides a round-trip packet loss rate of 0. By repeating such downstream measurement several times, an average downstream packet loss of 0.2 would be found, which would provide an average round-trip packet loss rate of 0.2/20. It may be appreciated that this value is lower that the one obtained in the previous case (1.1/20), because it takes into account the fact that the lost packets are now all concentrated in the direction (downstream) having the higher packet rate, so that their weight is lower than in the previous case where the lost packets were equally distributed between both directions.

Such numeric examples clearly show that, if the one-way packet losses are measured on a same number of transmitted packets, the different packet rates in the two directions are duly taken into account, so that the number of lost packets in each direction has a 50% weight in the final value of the round-trip packet loss rate.

According to embodiments of the present invention, the above problem is solved by a method wherein a first node and a second node of a communication network exchange packets comprising a first packet loss field (also termed herein after "generation packet loss field") and a second packet loss field (also termed herein after "reflection packet loss field"), both fields being settable to either an idle value or a measurement value. The first node periodically performs a generation step whereby it transmits to the second node a block of packets having their generation packet loss fields set to the measurement value. Both the first node and the second node continuously reflect the values of the packet loss fields comprised in the packets received from the other node. In particular, the continuous reflection performed by the second node comprises, for each packet received from the first node having its generation packet loss field and/or its reflection packet loss field set to the measurement value, transmitting back to the first node a respective packet having its generation packet loss field and/or its reflection packet loss field set to the measurement value. The continuous reflection performed by the first node instead comprises, for each packet received from the second node having its generation packet loss field set to the measurement value, transmitting back to the second node a respective packet having its reflection packet loss field set to the measurement value.

The above behavior of the first and second node results in the following exchange of packets. During the first generation step, the first node transmits to the second node a first block of packets with their generation packet loss field set to the measurement value. By virtue of its continuously reflecting behavior, the second node transmits back to the first node a second block of packets also having their generation packet loss fields set to the measurement value. By virtue of its continuously reflecting behavior, the first node transmits back to the second node a third block of packets having their reflection packet loss field set to the measurement value.

Hence, reflection carried out by the first node basically "moves" the measurement value from the generation packet loss field to the reflection packet loss field, so that the generation packet loss field is free and may be used by the first node for the next generation step. Each generation step carried out by the first node is indeed temporally superimposed with the continuous reflection performed by the first node itself. Hence, during transmission of the third block by continuous reflection, the first node may also start a new generation step, which may result in one or more packets of the third block having both their generation and reflection packet loss fields set to the measurement value. By virtue of its continuously reflecting behavior, the second node transmits back to the first node a fourth block of packets having their reflection packet loss fields (and possibly also their generation packet loss field, as described above) set to the measurement value. And so on.

A measurement point may then count the number of packets in the first block and the number of packets in the third block transmitted from the first node to the second node, based on which a round-trip packet loss measurement can then be performed. It shall be noticed that the measurement point may be implemented and operated by an entity other than the entity managing the setting of the packet loss field of the packets at the first and second nodes of the communication network.

Hence, advantageously, since the first and third blocks of packets upon which the measurement is carried out are transmitted in a same direction (namely, from the first node to the second node), the round-trip packet loss may be measured by a single measurement point located between the first and second node and configured to detect packets in that direction.

Further, since the packets in the third block are obtained by a double reflection—at the second node and then at the first node—of the first packets, the measurement of the round-trip packet loss is advantageously performed on a same number of packets (short of lost packets) transmitted in both directions between the first and second node, independently of the packet rates in the two directions. Hence, as discussed above, the measurements are accurate even when the two directions exhibit different packet rates.

Further, since two packet loss fields are used, the first node does not need to wait the end of the reflection of the second block of packets before starting a new generation step. The reflection at the first node indeed "moves" the measurement value identifying the packets to be subjected to the measurement from the generation packet loss field to the reflection packet loss field, so that a new period (namely, a new generation step) may be started irrespective of whether the reflection of the second block is completed or not. This ultimately results in a higher measurement throughput or, equivalently, a reduced measurement period in comparison to a case wherein, for example, a single packet loss field is used for identifying packets to be subjected to the measurement.

According to a first aspect, the present invention provides a method for exchanging packets in a packet-switched communication network, the method comprising exchanging, between a first node and a second node of the communication network, packets comprising a generation packet loss field and a reflection packet loss field, wherein each one of the generation packet loss field and reflection packet loss field is settable to a measurement value, the method comprising a) by the first node, performing a generation step comprising transmitting to the second node a first packet having the generation packet loss field set to the measurement value;
b) by the second node, upon reception of the first packet from the first node, transmitting to the first node a second packet having the generation packet loss field set to the measurement value; and
c) by the first node, upon reception of the second packet from the second node, transmitting to the second node a third packet having the reflection packet loss field set to the measurement value.

Preferably, the generation step is periodically performed.

Preferably, the generation step has a predefined duration $T_G$.

According to an advantageous variant, the first node starts counting the predefined duration $T_G$ upon transmission of the first packet.

According to some embodiments, at step c) the third packet is the next packet to be transmitted to the second node after reception of the second packet.

According to other embodiments, at step c) the third packet is the next packet to be transmitted to the second node after a predetermined time $T_R$ has lapsed since transmission of the first packet.

According to these embodiments, the predetermined time $T_R$ is higher than a round-trip time between the first node and the second node. The round-trip time is preferably calculated by the first node as a difference between transmission time of the first packet and reception time of the second packet.

According to advantageous variants, step a) comprises transmitting the first packet when a preceding packet is received from the second node, irrespective of the value of its generation packet loss field and reflection packet loss field.

Optionally, also step c) comprises transmitting the third packet when a preceding packet is received from the second node, irrespective of the value of its generation packet loss field or reflection packet loss field.

According to an embodiment, each one of the generation packet loss field and reflection packet loss field comprises one bit, each one of the generation packet loss field and reflection packet loss field being settable to either one idle value or one measurement value.

According to this embodiment, the method further comprises a pause between consecutive iterations of the generation step, the pause comprising keeping the generation packet loss field equal to the idle value in at least one packet to be transmitted to the second node during the pause. The pause preferably has a substantially constant and predefined duration $T_P$.

According to another embodiment, each one of the generation packet loss field and reflection packet loss field comprises more than one bit, each one of the generation packet loss field and reflection packet loss field being settable to either anyone of at least two idle values or anyone of at least two measurement values, the first node switching measurement value of the generation packet loss field at each iteration of step a).

According to a second aspect, the present invention provides a method for performing a round-trip packet loss measurement in a packet-switched communication network, the method comprising the steps of the method for exchanging packets as set forth above and:

d) at a measurement point, providing a first parameter indicative of detection of the first packet and providing a second parameter indicative of detection of the third packet, the round-trip packet loss measurement being based on the first parameter and the second parameter.

According to a third aspect, the present invention provides a packet-switched communication network comprising a first node and a second node configured to exchange packets comprising a generation packet loss field and a reflection packet loss field, wherein each one of the generation packet loss field and reflection packet loss field is settable to a measurement value, wherein:

the first node is configured to perform a generation step comprising transmitting to the second node a first packet having the generation packet loss field set to the measurement value;
the second node is configured to, upon reception of the first packet from the first node, transmit to the first node a second packet having the generation packet loss field set to the measurement value; and
the first node is further configured to, upon reception of the second packet from the second node, transmit to the second node a third packet having the reflection packet loss field set to the measurement value.

Preferably, the packet-switched communication network further comprises at least one measurement point configured to provide a first parameter indicative of detection of the first packet and provide a second parameter indicative of detection of the third packet.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
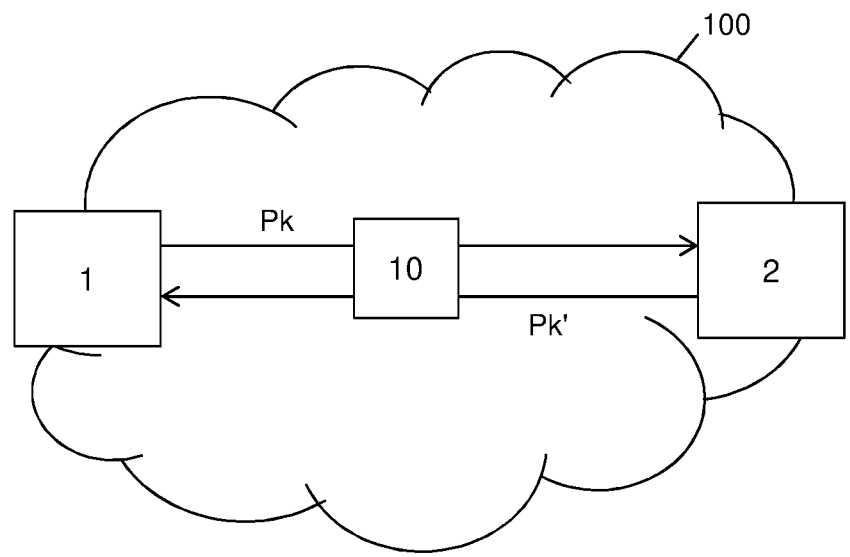
FIG. 1 schematically shows a packet-switched communication network configured to exchange packets so as to enable round-trip packet loss measurements according to an embodiment of the present invention.

FIG. 1 schematically shows a packet-switched communication network 100 configured to exchange packets so as to enable round-trip packet loss measurements according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The node 1 is configured to transmit packets Pk to the node 2, while the node 2 is configured to transmit packets Pk' to the node 1, as schematically depicted in FIG. 1. The packets Pk may belong to a same packet flow (namely, they may all have a same source address and a same destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol, or TCP (Transmission Control Protocol).

Figure 2:
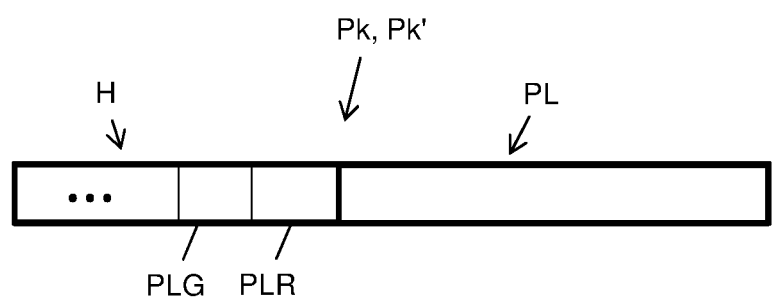
FIG. 2 schematically shows the structure of a packet exchanged in the communication network of FIG. 1, according to embodiments of the present invention.

As schematically depicted in FIG. 2, each packet Pk, Pk' comprises a payload PL and a header H. The payload PL comprises user data. The header H of each packet Pk, Pk' is formatted according to the network protocol supported by the network 100 and comprises packet forwarding information (not shown in FIG. 2), namely information allowing the nodes of the network 100 to properly handle the packets Pk, Pk' so that they reach their destination nodes.

According to embodiments of the present invention, the header H of each packet Pk, Pk' preferably also comprises a first packet loss field (also termed herein after "generation packet loss field") PLG and a second packet loss field (also termed herein after "reflection packet loss field") PLR. Each packet loss field PLG, PLR comprises one or more bits. Each packet loss field PLG, PLR may be set to anyone of:
- at least one idle value (e.g. "0" in case of a one-bit field PLG, PLR or "00" and "10" in case of a two-bit field PLG, PLR); and
- at least one measurement value (e.g. "1" in case of a one-bit field PLG, PLR or "01" and "11" in case of a two-bit field PLG, PLR).

Figure 3:
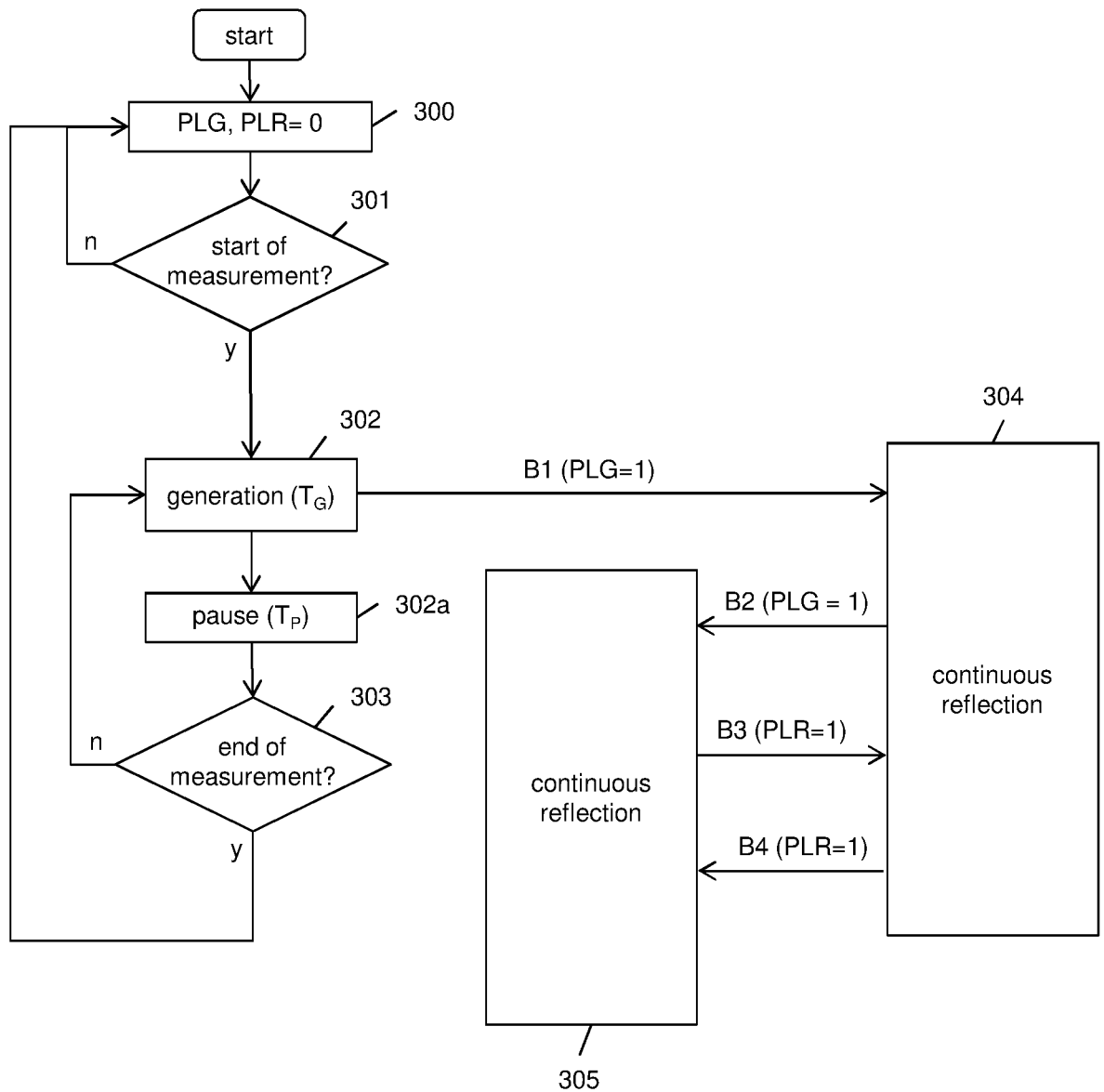
FIG. 3 is a flow chart of the operation of a first and second node of the communication network of FIG. 1, according to a first embodiment of the present invention.

With reference to the flow chart of FIG. 3, the operation of the nodes 1 and 2 will be now described in detail, according to an embodiment of the present invention. It is assumed that each packet loss field PLG, PLR is a single-bit field settable to either one idle value (e.g. "0") or one measurement value (e.g. "1").

Preferably, the node 1 normally transmits to the node 2 packets Pk having their generation packet loss field PLG and their reflection packet loss field PLR set to the idle value and, similarly, the node 2 transmits to the node 1 packets Pk' having their generation packet loss field PLG and their reflection packet loss field PLR set to the idle value (step 300).

Preferably, as the node 1 determines that a round-trip measurement shall be started (step 301), it performs a generation step (step 302) which comprises transmitting to the node 2 a block B1 of packets Pk having their generation packet loss field PLG set to the measurement value. The generation step 302 does not affect the reflection packet loss field PLR, which accordingly—at least during the first generation step 302—continues being equal to the idle value.

The generation step 302 may have a predefined and substantially constant duration $T_G$. In this case, the node 1 preferably terminates the generation step 302 when it determines that the time $T_G$ has lapsed since its beginning. The number N1 of packets Pk in the block B1 therefore depends on $T_G$, on the packet rate from the node 1 to the node 2 and, according to some embodiments, also on the packet rate from the node 2 to the node 1, as it will be described in detail herein after. Preferably, the node 1 starts counting the duration $T_G$ upon transmission of the first packet Pk of the block B1. This guarantees that the block B1 comprises at least one packet Pk.

Alternatively, the node 1 preferably terminates the generation step 302 when it determines that a predefined number N1 of packets Pk with generation packet loss field PLG set to the measurement value "1" have been transmitted. In this case, the duration $T_G$ of the generation step 302 is variable and depends on N1, on the packet rate from the node 1 to the node 2 and, according to some embodiments, also on the packet rate from the node 2 to the node 1, as it will be described in detail herein after.

After termination of the generation step 302, the node 1 preferably performs a pause 302a. During the pause 302a, the node 1 preferably keeps the generation packet loss field PLG equal to the idle value in each packet Pk to be transmitted. Also the pause 302a does not affect the reflection packet loss field PLR, which accordingly —at least during the pause 302a following the first generation step 302—continues being equal to the idle value.

The pause 302a preferably has a predefined and substantially constant duration $T_P$. Preferably, the duration of the pause $T_P$ is long enough to allow identification of the pause 302a by the measurement points MP1, MP2 and distinguish it from other pauses, e.g. from time intervals during which no packets Pk are transmitted. According to a preferred embodiment, the duration $T_P$ is lower than or equal to $T_G$. Since, as it will be described herein below, the measurement throughput is $T_G/(T_G+T_P)$, a duration $T_P$ lower than or equal to $T_G$ advantageously provides a measurement throughput higher than or equal to 50% (meaning that at least half the exchanged packets are involved in the round-trip packet loss measurement). For example, the duration $T_P$ may be equal to $T_G/2$ (if $T_G$ is constant and predefined), providing a measurement throughput equal to 67%.

Upon completion of the pause 302a, the node 1 preferably determines if the round-trip packet loss measurement shall be terminated or not (step 303).

In the affirmative, the node 1 preferably reverts to step 300, namely it restarts transmitting to the node 2 packets Pk having their generation packet loss field PLG and reflection packet loss field PLR set to the idle value.

In the negative, the node 1 preferably performs a new generation step 302, thereby transmitting to the node 2 a new block B1' of packets Pk having their generation packet loss field PLG set to the measurement value. Again, the generation step 302 does not affect the reflection packet loss field PLR. However, at this new iteration of the generation step 302—and at the subsequent ones—the reflection packet loss field PLR in the packets Pk of the new block B1' may be equal to the measurement value, as it will be described in detail herein after.

While the node 1 periodically performs the generation step 302 (and pause 302a) as described above, the node 2 preferably continuously reflects towards the node 1 the value of the generation packet loss field PLG and reflection packet loss field PLR comprised in the packets Pk received from the node 1 (step 304).

In particular, when the node 2 receives from the node 1 a packet Pk having its generation packet loss field PLG set to the idle value/measurement value, it preferably sets to the idle value/measurement value the generation packet loss field PLG of the next packet Pk' to be transmitted to the node 1. Similarly, when the node 2 receives from the node 1 a packet Pk having its reflection packet loss field PLR set to the idle value/measurement value, it preferably sets to the idle value/measurement value the reflection packet loss field PLR of the next packet Pk' to be transmitted to the node 1.

Therefore, when the node 2 receives the block B1 of packets Pk generated during the generation step 302, it preferably transmits back to the node 1 a block B2 of packets Pk' having their generation packet loss field PLG set to the measurement value. If no packet loss occurs in the transmission of block B1 from node 1 to node 2, the block B2 comprises the same number N2=N1 of packets Pk' as the block B1. If a packet loss occurred, instead, the number N2 of packets Pk' in the transmitted block B2 is lower than N1.

According to an embodiment, step 304 is performed by implementing at the node 2 two counters $C_G$ and $C_R$, the counter $C_G$ being increased by 1 each time a packet Pk with generation packet loss field PLG equal to the measurement value is received and the counter $C_R$ being increased by 1 each time a packet Pk with reflection packet loss field PLR equal to the measurement value is received. For each packet Pk' to be transmitted to the node 1, the node 2 preferably checks the values of the counters $C_G$ and $C_R$. If the value of $C_G$ is higher than 0, the counter $C_G$ is decreased by 1 and the generation packet loss field PLG of the packet Pk' is set to the measurement value, otherwise it is set to the idle value and the counter $C_G$ is not changed. Further, if the value of $C_R$ is higher than 0, the counter $C_R$ is decreased by 1 and the reflection packet loss field PLR of the packet Pk' is set to the measurement value, otherwise it is set to the idle value and the counter $C_R$ is not changed.

While the node 1 periodically performs the generation step 302 (and pause 302a) as described above, it also preferably continuously reflects towards the node 1 the value of the generation packet loss field PLG comprised in the packets Pk' received from the node 2 (step 305).

In particular, when the node 1 receives from the node 2 a packet Pk' having its generation packet loss field PLG set to the idle value/measurement value, it preferably sets to the idle value/measurement value the reflection packet loss field PLR of the next packet Pk to be transmitted to the node 2.

Therefore, when the node 1 receives the block B2 of packets Pk' transmitted by the node 2, it preferably transmits back to the node 2 a block B3 of packets Pk having their reflection packet loss field PLR set to the measurement value. If no packet loss occurs, the block B3 comprises the same number N3=N2 of packets Pk as the block B2. If a packet loss occurred, instead, the number N3 of packets Pk in the block B3 is lower than N2.

Hence, reflection 305 carried out by the node 1 basically "moves" the measurement value from the generation packet loss field PLG in the received packets Pk' of the block B2 to the reflection packet loss field PLR in the transmitted packets Pk of the block B3. This way, the generation packet loss field PLG in the packets Pk is free and may be used by the node 1 for the next generation step 302. Each iteration of the generation step 302 carried out by the node 1 is indeed temporally superimposed with the continuous reflection 305 performed by the node 1 itself. Hence, during transmission of the block B3 of packets Pk by continuous reflection 305, the node 1 may also start a new generation step 302, depending on the duration of the pause 302a and the round-trip time between node 1 and node 2. This may result in one or more packets Pk of the block B3 having both their generation packet loss field PLG and reflection packet loss field PLR set to the measurement value. In other words, the block B3 and the next block B1' may at least partially overlap, in that one or more packets Pk of the block B3 may, at the same time, belong also to the next block B1'. While the belonging of a packet Pk to the block B3 is indicated by its reflection packet loss field PLR being equal to the measurement value, the belonging of the same packet Pk to the next block B1' is instead indicated by its generation packet loss field PLG being equal to the measurement value.

According to an embodiment, the continuous reflection 305 at the node 1 is performed by a reflection counter, which the node 1 increases by 1 each time a packet Pk' is received from the node 2, whose generation packet loss field PLG comprises the measurement value. When the node 1 has to transmit a packet Pk, it preferably checks whether the reflection counter value is higher than 0. In the affirmative, the node 1 preferably sets the reflection packet loss field PLR of the packet Pk to be transmitted equal to the measurement value and decreases the reflection counter by 1. If instead the reflection counter is equal to 0, the node 1 preferably sets the reflection packet loss field PLR of the packet Pk to be transmitted equal to the idle value. The setting of the generation packet loss field PLG in the packet Pk to be transmitted is instead governed by the periodic generation mechanism, as described above.

According to an advantageous variant, the continuous reflection 305 at the node 1 comprises one or more pauses.

In particular, according to such advantageous variant, the node 1 starts reflecting the block B2 of packets Pk' received from the node 2 after a time $T_R$ has lapsed since the beginning of the previous generation step 302. To this purpose, the node 1 increases the reflection counter by 1 upon reception of each packet Pk' whose generation packet loss field PLG comprises the measurement value, as described above. However, before starting to set the reflection packet loss field PLR of the packets Pk to be transmitted to the node 2 equal to the measurement value and decrease the reflection counter accordingly, the node 1 preferably waits a time $T_R$ since the beginning of the previous generation step 302.

The time $T_R$ may be set equal to $T_G+T_P$. Alternatively, the node 1 may calculate the RTT based on transmission time of the first packet Pk of the block B1 and reception time of the first packet Pk' of the block B2 and set $T_R$ to a value higher than the calculated RTT.

The time $T_R$ may also be determined by the node 1 based on a multiple-threshold mechanism. For example, two or more RTT thresholds may be decided, e.g. RTT1=100 ms, RTT2=300 ms and RTT3=1000 ms (RTT3 being the maximum RTT on the link between the nodes 1 and 2). Then, the node 1 calculates the RTT as described above and:
if RTT<RTT1, then $T_R$ is set equal to RTT1;
if RTT1≤RTT<RTT2, then, $T_R$ is set equal to RTT2; and
if RTT2≤RTT<RTT3, then $T_R$ is set equal to RTT3.

Since the time $T_R$ lapsing between start of generation 302 (namely, start of transmission of the block B1) and start of reflection (namely, start of transmission of the block B3) has a predefined and substantially constant duration, the round-trip packet loss measurement is advantageously totally decoupled from the RTT or—in other words—the measurement point 10 can not derive any information on the RTT from the features of packets Pk and Pk' exchanged between the nodes 1 and 2. This is advantageous because the RTT measurement provides a rough indication of the distance between client and server, which distance could in turn be used to determine other information on the client—such as its position—which might be critical from the privacy point of view.

Referring again to the flow chart of FIG. 3, when the node 2 receives the block B3 of packets Pk generated during the reflection step 305 (either with pauses or not), it preferably transmits back to the node 1 a block B4 of packets Pk' having their reflection packet loss field PLR set to the measurement value, as a result of its above described continuously reflecting behaviour 304. If no packet loss occurs, the block B4 comprises the same number N4=N3 of packets Pk' as the block B3. If a packet loss occurred, instead, the number N4 of packets Pk' in the block B4 is lower than N3.

If, as described above, one or more packets Pk of the block B3 have also their generation packet loss field PLG set to the measurement value (namely, they belong also to the next block B1'), one or more corresponding packets Pk' of the block B4 will also have their generation packet loss field PLG set to the measurement value, as a result of the above described continuously reflecting behaviour 304 of the node 2. Such packets Pk' therefore belong not only to the block B4, but also to the next block B2' resulting from reflection of the next block B1.

Since the continuously reflecting behaviour of the node 1 does not contemplate any reflection of the reflection packet loss field PLR comprised in the received packets Pk', the block B4 of packets Pk is not further reflected by the node 1.

Hence, at each iteration of steps 301-305 performed between start and end of the measurement session, the nodes 1 and 2 exchange four blocks B1, B2, B3, B4 of packets, the packets in blocks B1 and B2 having their generation packet loss field PLG set to the measurement value and the packets in blocks B3 and B4 having their reflection packet loss field PLR set to the measurement value. If no packet loss occurs, the blocks B1, B2, B3, B4 comprise a same number of packets.

Figure 4:
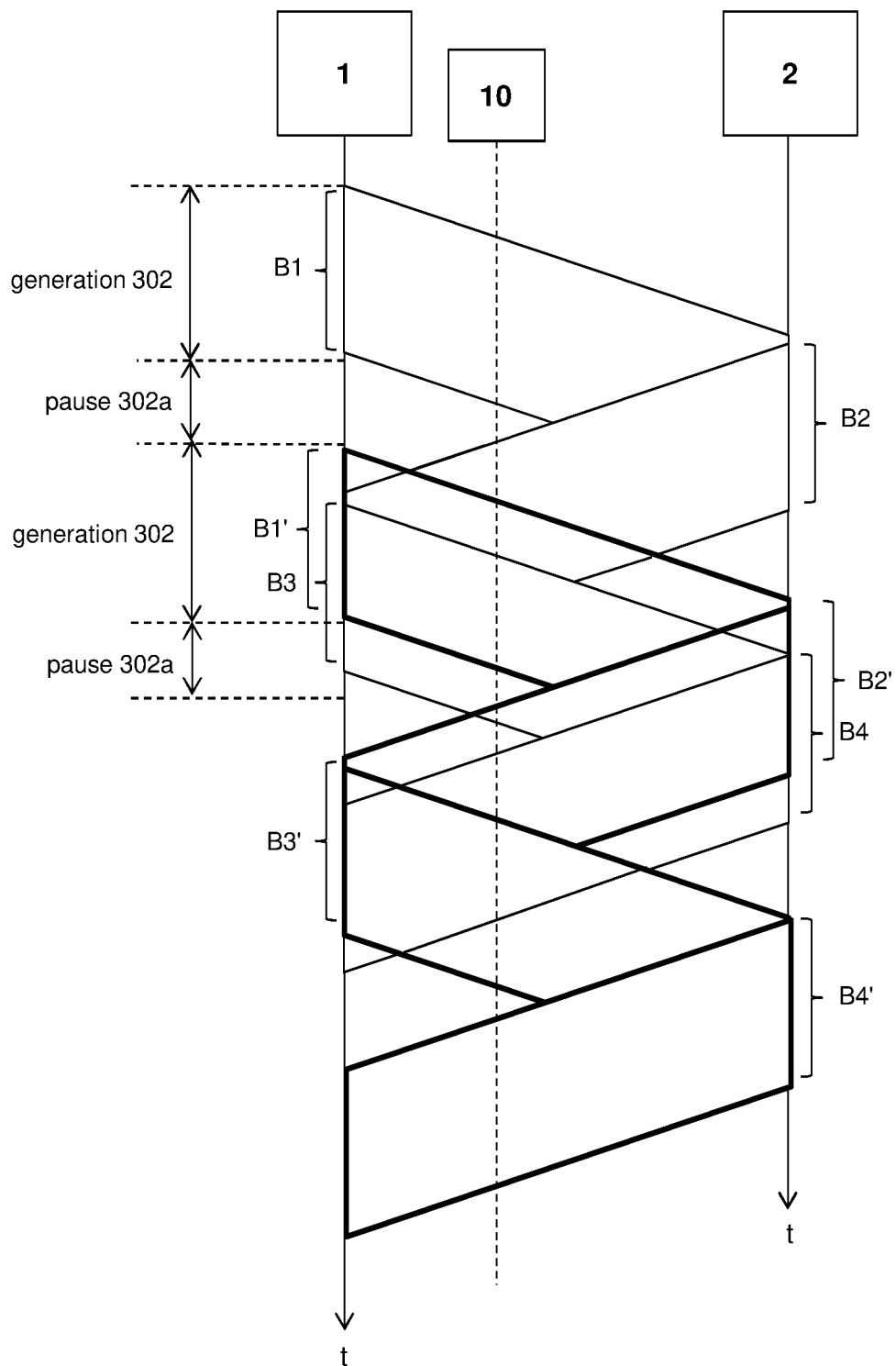
FIG. 4 schematically shows packets exchanged by the first and second node operating according to the flow chart of FIG. 3.

FIG. 4 shows an exemplary exchange of packets between two nodes 1 and 2 operating according to the flow chart of FIG. 3.

In FIG. 4 it may be seen that during a first iteration of the generation step 302 a block B1 of N1 packets Pk with PLG equal to the measurement value is generated and transmitted to the node 2. The PLR of such packets Pk is equal to the idle value, since—as described above—the generation step 302 does not affect the value of PLR. The node 1 then performs a pause 302a, during which it transmits packets Pk with generation packet loss field PLG kept to the idle value (not depicted in FIG. 4) Since the node 2 continuously reflects the values of both PLG and PLR, if no packet loss occurs the node 2 reflects back a block B2 of packets Pk' with PLG equal to the measurement value and PLR equal to the idle value.

If the round-trip time between the nodes 1 and 2 is longer than $T_G+T_P$, the node 1 starts a new generation step 302 before the first packet Pk' of the block B2 is received, thereby generating a new block B1' of packets Pk with PLG equal to the measurement value.

Since the node 1 also continuously reflects the value of PLG by "moving" it in PLR, as long as no packet Pk' of the block B2 is received at the node 1, the packets Pk of the new block B1' have their PLR equal to the idle value. When instead the node 1 starts receiving the packets Pk' of the block B2, the remaining packets Pk of the new block B1' have also their PLR equal to the measurement value, since they are also part of the block B3 obtained by reflection of the block B2.

Since the node 2 continuously reflects the values of both PLG and PLR, the node 2 reflects back to the node 1 both a new block B2' (obtained by reflection of the new block B1') and a block B4 (obtained by reflection of the block B3). In FIG. 4 it is assumed that the reflection carried out by the node 1 comprises no pauses. However, as described above, the node 1 could delay reflection (namely, transmission of the block B3) by a time $T_R$ calculated since the beginning of the previous generation step 302, in order to "hide" any information from which the RTT between the nodes 1 and 2 may be inferred.

While the block B4 is terminated at the node 1, the block B2' is further reflected into a block B3' by the node 1 and then into a block B4' by the node 2. Ad discussed above, transmission of the block B3' may be superimposed with a further generation step 302, whereby a further new block B1" (not shown in FIG. 4) is transmitted to the node 2, thereby starting a new measurement period.

In order to perform a round-trip packet loss measurement between the nodes 1 and 2, a measurement point 10 may be provided in an intermediate position between the nodes 1 and 2, as schematically depicted in FIG. 1. This is not limiting. The measurement point 10 may be also provided at the node 1 or 2.

The measurement point 10 may be configured to detect packets Pk transmitted in the direction from the node 1 to the node 2 and count the number N1 of packets Pk in the block B1 and the number N3 of packets Pk in the block B3. The round-trip packet loss between the nodes 1 and 2 may then be calculated as the difference N1-N3. The calculation may be repeated for each pair of blocks B1-B3, thereby providing a periodic monitoring of the round-trip packet loss.

If instead the measurement point 10 is configured to detect packets Pk' transmitted in the opposite direction from the node 2 to the node 1, the measurement point 10 preferably counts the number N2 of packets Pk' in the block B2 and the number N4 of packets Pk' in the block B4. The round-trip packet loss between the nodes 1 and 2 in this case may then be calculated as the difference N2-N4. The calculation may be repeated for each pair of blocks B2-B4, thereby providing a periodic monitoring of the round-trip packet loss.

More specifically, with reference for example to the direction from node 1 to node 2, the measurement point 10 preferably implements a counter C(G) counting the number of packets Pk having their generation packet loss field PLG equal to the measurement value and a counter C(R) counting the number of packets Pk having their reflection packet loss field PLR equal to the measurement value. Hence, the measurement point 10 preferably increases the counter C(G) by 1 each time it detects a packet Pk with generation packet loss field PLG equal to the measurement value and increases the counter C(R) by 1 each time it detects a packet Pk with generation packet loss field PLG equal to the measurement value.

Hence, the counter C(G) increases during time periods equal to about $T_G$, alternated with pauses of about $T_P$ during which the counter C(G) is substantially constant. The same applies to the counter C(R), which is however delayed relative to the counter C(G) by a RTT (round-trip time) between the nodes 1 and 2.

Figure 5:
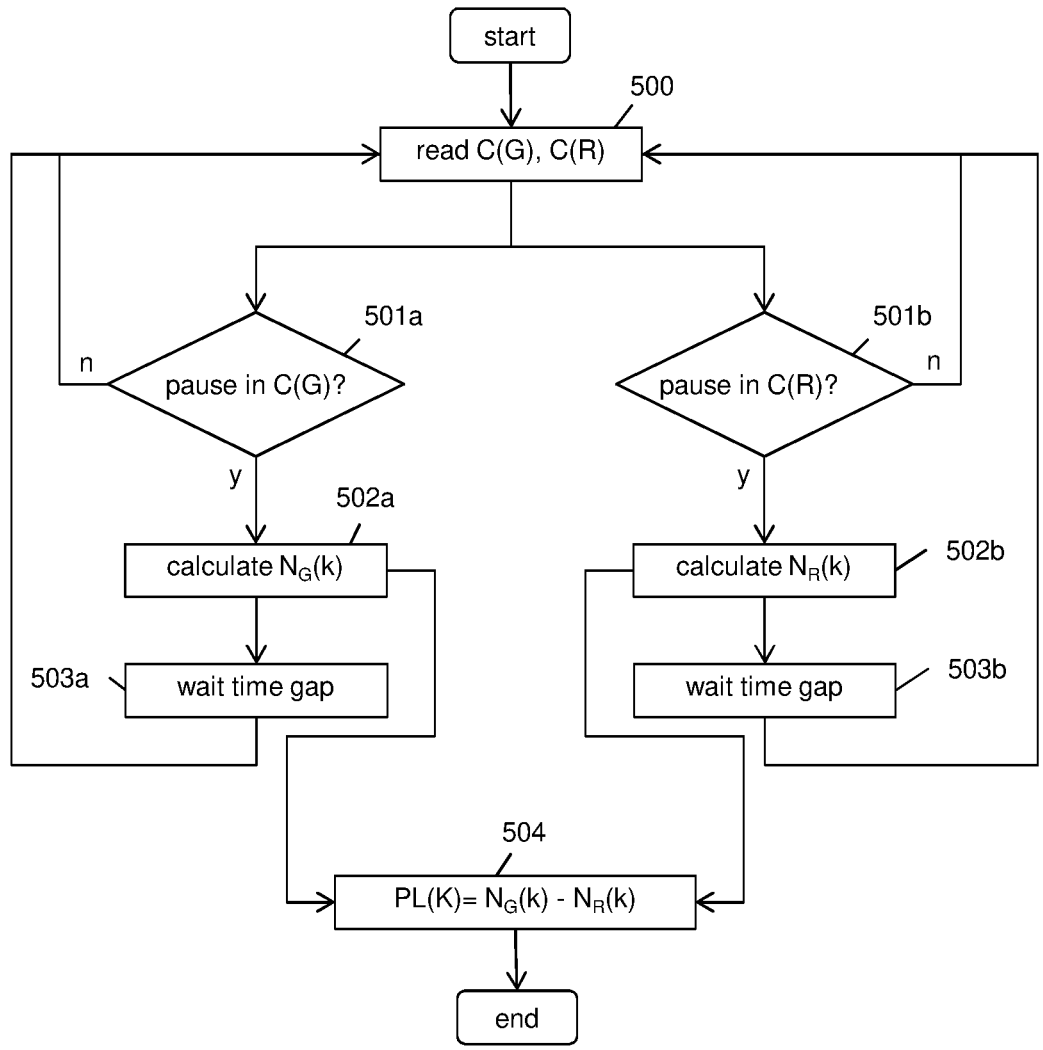
FIG. 5 is a flow chart of the operation of a measurement point, according to an embodiment of the present invention.

In order to perform a round-trip packet loss measurement, the measurement point 10 preferably performs the steps shown in the flow chart of FIG. 5.

While it increases the counters C(G) and C(R) as described above, the measurement point 10 preferably continuously monitors the values of the counters C(G) and C(R) (step 500), looking for possible pauses of duration of about $T_P$ in the increase of the counter C(G) (step 501a) and C(R) (step 501b).

As the measurement point 10 detects a pause in the increase of the counter C(G), the measurement point 10 preferably calculates a number $N_G(k)$ of packets Pk with PLG equal to the measurement value detected during the current (namely, the $k^{th}$) measurement period (step 502a), as a difference between the current value of the counter C(G) and the value of the counter C(G) at the last detected pause. At step 501a, the measurement point 10 preferably detects a pause when no increase of the counter C(G) is detected for a predefined time, e.g. $T_P/2$. Upon detection of a pause, the measurement point 10 then preferably waits for a time gap of e.g. $T_P/2$ before starting to look for the next pause (step 503a). This way, the measurement point 10 preferably provides a sequence of numbers $N_G(k)$, k=1, 2, . . . , k being the measurement period index.

The measurement point 10 performs similar operations also on the counter C(R) (steps 502b, 503b), thereby providing also a sequence of numbers $N_R(k)$, k=1, 2, . . . , k being the measurement period index.

Then, for each measurement period, the measurement point 10 preferably calculates a round-trip packet loss PL(k) as a difference between $N_G(k)$ and $N_R(k)$ (step 504).

The obtained packet loss measurement is "round-trip" in that it does not provide any indication as to the distribution of the lost packets between the two directions.

However, since each block B3 of packets Pk is obtained by a double reflection—at the node 2 and then at the node 1—of a respective block B1 of packets Pk (and, similarly, in the opposite direction each block B4 of packets Pk' is obtained by a double reflection—at the node 1 and then at the node 2—of a respective block B2 of packets Pk'), the measurement of the round-trip packet loss is advantageously performed on a same number of packets transmitted in both directions between the nodes 1 and 2, independently of the packet rates in the two directions. Hence, as discussed above, the measurements are accurate even when the two directions exhibit different packet rates.

Further, since two packet loss fields PLG, PLR are used, the node 1 does not need to wait the end of the reflection of the block B2 of packets Pk before starting a new generation step 302. The reflection 305 at the node 1 indeed "moves" the measurement value identifying the packets Pk to be subjected to the measurement from the generation packet loss field PLG to the reflection packet loss field PLR, so that a new period (namely, a new generation step 302) may be started irrespective of whether the reflection of the block B2 is completed or not. This ultimately results in a higher measurement throughput or, equivalently, a reduced measurement period in comparison to a case wherein, for example, a single packet loss field is used for identifying packets to be subjected to the measurement. In particular, the measurement throughput (which is defined as the percentage of packets Pk, Pk' involved in the measurements) is $T_G/(T_G+T_P)$. If, for example, $T_G=70$ ms and $T_P=30$ ms, the measurement throughput is equal to 70%.

The Applicant has noticed that, due to very different packet rates in the two directions, the reflection at the node transmitting at the lower packet rate may take a too long time. For example, if the packet rate from the node 2 to the node 1 is $1/10$ the packet rate from the node 1 to the node 2, a too long time may lapse before the node 2 transmits N2=N1 packets Pk' with their generation packet loss field PLG set to the measurement value. This is undesirable because, in order to monitor the round-trip packet loss, a measurement period of the order of magnitude of tens-hundreds of milliseconds is typically desired.

In order to obviate this drawbacks, according to a particularly advantageous variant, at the generation step 302 the node 1 preferably sets the generation packet loss field PLG of the next packet Pk to be transmitted equal to the measurement value each time a packet Pk' is received from the node 2, independently of the value of its generation packet loss field PLG or reflection packet loss field PLR.

For example, the generation step 302 may be performed by the node 1 by means of a generation counter, which the node 1 increases by 1 each time a packet Pk' is received from the node 2 after the start of the generation step, independently of the value comprised in its generation packet loss field PLG and reflection packet loss field PLR. Each time the node 1 shall transmit a packet Pk during the generation step 302, it preferably checks whether the generation counter is higher than 0. If the generation counter is higher than 0, the node 1 preferably sets the generation packet loss field PLG of the packet Pk to be transmitted equal to the measurement value and decreases the generation counter by 1. If instead the generation counter is equal to 0, the node 1 preferably leaves the generation packet loss field PLG of the packet Pk to be transmitted equal to the idle value and does not decrease the generation counter. According to an advantageous variant, the generation counter may be increased up to a maximum value (e.g. 1). If the generation counter reaches the maximum value, reception of further packets Pk' from the node 2 is ignored—namely, it does not induce any further increase of the generation counter—until the generation counter falls again below the maximum value. This advantageously prevents transmission of bursts of packets Pk during the generation step 302, which could congest the node 2.

This way, the packets Pk of the block B1 transmitted during the generation step 302 may be non contiguous. If the packet rate in the direction from the node 2 to the node 1 is lower than the packet rate from node 1 to node 2, indeed, during the generation step 302 some packets Pk will be transmitted from node 1 with their generation packet loss field PLG equal to the idle value between reception of two consecutive packets Pk' from the node 2.

Similarly, according to a particularly advantageous variant, during continuous reflection 305 (either with pauses as described above or not) the node 1 also preferably sets the reflection packet loss field PLR of the next packet Pk to be transmitted equal to the measurement value each time a packet Pk' is received from the node 2, independently of the value of its generation packet loss field PLG or reflection packet loss field PLR.

This mechanism balances possible differences between the packet rates in the two opposite directions.

According to some embodiments, the generation packet loss field PLG and the reflection packet loss field PLR may comprise more than 1 bit, for example 2 bits. In this case, the node 1 may alternate generation steps 302 wherein the generation packet loss field PLG is set to a first measurement value (e.g. "01") with generation steps 302 wherein the generation packet loss field PLG is set to a second measurement value (e.g. "11"). In this case, the node 2 is still preferably configured to reflect the values of PLR and PLG, while the node 1 is preferably configured to reflect the first measurement value of the PLG in the received packets Pk' into a corresponding first measurement value of the PLR in the packets Pk to be transmitted and, similarly, to reflect the second measurement value of the PLG in the received packets Pk' into a corresponding second measurement value of the PLR in the packets Pk to be transmitted.

This way, the node 1 does not need to perform any pause between consecutive generation steps 302, since the measurement point 10 is capable of properly distinguishing packets Pk (or Pk') pertaining to different measurement periods based on the different values of their PLG or PLR. The measurement throughput is accordingly further increased, and may be 100% (at least in the direction with lower packet rate, if the above mechanism for balancing the different packet rates in the two directions is used).

Also according to these embodiments with generation packet loss field PLG and reflection packet loss field PLR comprising more than 1 bit, the continuous reflection 305 carried out by the node 1 may comprise pauses, namely the node 1 may wait a time $T_R$ since the beginning of the preceding generation step 302 before starting transmission of the block B3 of packets Pk. As discussed above, this advantageously allows "hiding" any information from which the RTT between the nodes 1 and 2 may be inferred.

Also according to these embodiments, the generation step 302 and/or the continuous reflection 305 may provide for transmitting a packet Pk with either generation packet loss field PLG (in case of generation) or reflection packet loss field PLR (in case of reflection) set to the measurement value each time a packet Pk' is received from the node 2, independently of the value of its generation packet loss field PLG or reflection packet loss field PLR. As discussed above, this advantageously allows balancing possible differences between the packet rates in the two opposite directions.

The invention claimed is:

1. A method for exchanging packets in a packet-switched communication network, said method comprising exchanging between a first node and a second node of said communication network packets comprising a generation packet loss field, a reflection packet loss field, and a payload comprising user data, wherein each one of said generation packet loss field and reflection packet loss field is settable to a measurement value, said method comprising:
    a) by said first node, performing a generation step comprising transmitting to said second node a first packet having said generation packet loss field (PLG) set to said measurement value;
    b) by said second node, upon reception of said first packet from said first node, transmitting to said first node a second packet having said generation packet loss field (PLC) set to said measurement value; and
    c) by said first node, upon reception of said second packet from said second node, transmitting to said second node a third packet having said reflection packet loss field (PLR) set to said measurement value.

2. The method according to claim 1, wherein said generation step is periodically performed.

3. The method according to claim 2, wherein said first node starts counting said predefined duration upon transmission of said first packet.

4. The method according to claim 2, wherein each one of said generation packet loss field (PLG) and reflection packet loss field (PLR) comprises one bit, each one of said generation packet loss field (PLG) and reflection packet loss field (PLR) being settable to either one idle value or one measurement value.

5. The method according to claim 4, further comprising a pause between consecutive iterations of said generation step, said pause comprising keeping said generation packet loss field (PLG) equal to said idle value in at least one packet to be transmitted to said second node during said pause.

6. The method according to claim 5, wherein said pause has a substantially constant and predefined duration.

7. The method according to claim 2, wherein each one of said generation packet loss field (PLG) and reflection packet loss field (PLR) comprises more than one bit, each one of said generation packet loss field (PLG) and reflection packet loss field (PLR) being settable to either anyone of at least two idle values or anyone of at least two measurement values, said first node switching measurement value of said generation packet loss field (PLG) at each iteration of said step a).

8. The method according to claim 1, wherein said generation step has a predefined duration.

9. The method according to claim 1, wherein at step c) said third packet is the next packet to be transmitted to said second node after reception of said second packet.

10. The method according to claim 1, wherein at step c) said third packet is the next packet to be transmitted to said second node after a predetermined time has lapsed since transmission of said first packet.

11. The method according to claim 10, wherein said predetermined time is higher than a round-trip time between said first node and said second node.

12. The method according to claim 11, wherein said round-trip time is calculated by said first node as a difference between transmission time of said first packet and reception time of said second packet.

13. The method according to claim 1, wherein step a) comprises transmitting said first packet when a preceding packet is received from said second node, irrespective of the value of its generation packet loss field (PLG) and reflection packet loss field (PLR).

14. The method according to claim 1, wherein step c) comprises transmitting said third packet when a preceding packet (Pk') is received from said second node, irrespective of the value of its generation packet loss field (PLG) or reflection packet loss field (PLR).

15. A method for performing a round-trip packet loss measurement in a packet-switched communication network, said method comprising the steps of the method according to claim 1 and:
    d) at a measurement point, providing a first parameter indicative of detection of said first packet and providing a second parameter indicative of detection of said third packet, said round-trip packet loss measurement being based on said first parameter and said second parameter.

16. A packet-switched communication network comprising a first node and a second node configured to exchange packets comprising a generation packet loss field (PLG), a reflection packet loss field (PLR), and a payload comprising user data, wherein each one of said generation packet loss field (PLC) and reflection packet loss field (PLR) is settable to a measurement value, wherein:
    said first node is configured to perform a generation step comprising transmitting to said second node a first packet having said generation packet loss field (PLC) set to said measurement value;

said second node is configured to, upon reception of said first packet from said first node, transmit to said first node a second packet having said generation packet loss field (PLG) set to said measurement value; and said first node is further configured to, upon reception of said second packet from said second node, transmit to said second node a third packet having said reflection packet loss field (PLR) set to said measurement value.

17. The packet-switched communication network of claim 16, further comprising at least one measurement point configured to provide a first parameter indicative of detection of said first packet and provide a second parameter indicative of detection of said third packet.

* * * * *